United States Patent
Arregui et al.

(10) Patent No.: US 8,570,626 B2
(45) Date of Patent: Oct. 29, 2013

(54) PROVIDING A PROFILE TO EMULATE A COLOR MAP

(75) Inventors: Alejandra Terrón Arregui, Barcelona (ES); Martin Maria Saguer, Girona (ES)

(73) Assignee: Hewlett-Packard Development Company, L.P., Houston, TX (US)

(*) Notice: Subject to any disclaimer, the term of this patent is extended or adjusted under 35 U.S.C. 154(b) by 344 days.

(21) Appl. No.: 13/150,411

(22) Filed: Jun. 1, 2011

(65) Prior Publication Data

US 2012/0307264 A1  Dec. 6, 2012

(51) Int. Cl.
*H04N 1/60* (2006.01)

(52) U.S. Cl.
CPC .......... *H04N 1/6002* (2013.01); *H04N 1/6008* (2013.01); *H04N 1/603* (2013.01)
USPC ........... 358/518; 358/520; 345/591; 345/604; 382/167

(58) Field of Classification Search
USPC ........ 358/1.9, 505, 3.23, 3.24, 448, 450, 518; 345/690, 590, 102, 502, 589, 591, 593, 345/601, 629; 382/162, 131, 165; 347/9
See application file for complete search history.

(56) References Cited

U.S. PATENT DOCUMENTS

| | | | |
|---|---|---|---|
| 6,603,483 B1 * | 8/2003 | Newman | 345/593 |
| 7,667,872 B2 | 2/2010 | Presley | |
| 7,978,366 B2 * | 7/2011 | Ming | 358/1.9 |
| 8,280,161 B2 * | 10/2012 | Dalal et al. | 382/167 |
| 2005/0024430 A1 | 2/2005 | Kress | |
| 2007/0076260 A1 | 4/2007 | Upton | |
| 2009/0244563 A1 | 10/2009 | Nordback | |
| 2010/0149203 A1 | 6/2010 | Mebane | |
| 2010/0306645 A1 | 12/2010 | Roulland | |
| 2011/0058238 A1 * | 3/2011 | Sanchez et al. | 358/518 |
| 2011/0304866 A1 * | 12/2011 | Sawada | 358/1.9 |

OTHER PUBLICATIONS

International Color Consortium (www.color.org) sRGB Profiles dated on or before Apr. 19, 2011 (3 pages).
International Color Consortium, White Paper #7, The role of ICC profiles in a colour reproduction system dated Dec. 2004 (11 pages).
International Color Consortium, White Paper 23, RGB Color Managed Workflow Example, May 2008 (6 pages).
Wikipedia, ICC Profile, Jan. 2011 (3 pages).
Stone et al., ACM Transactions on Graphics, vol. 7, No. 4, Oct. 1988, Color Gamut Mapping and the Printing of Digital Color Images (44 pages).
Morovic et al., Journal of Imaging Science and Technology, Jul. 2000, The Fundamentals of Gamut Mapping: A Survey (36 pages).
Marti Maria, www.littlecms.com, How to use the engine in your applications, Version 2.1, Oct. 2010 (59 pages).
International Color Consortium, (www.color.org) Making Color Seamless Between Devices and Documents dated on or before May 17, 2011 (4 pages).

* cited by examiner

*Primary Examiner* — Scott A Rogers

(57) ABSTRACT

A profile combines at least the following: a color map between device-dependent color spaces, a first output profile that characterizes a mapping between a color space of a first output device being emulated and a device-independent color space, and a second output profile that characterizes a mapping between a color space of a second output device and the device-independent color space.

20 Claims, 5 Drawing Sheets

PROVIDING A PROFILE TO EMULATE A COLOR MAP

BACKGROUND

Some printers have customized color maps for mapping between a source color space (e.g. sRGB or AdobeRGB color space) and a target color space (e.g. device native RGB color space). The sRGB color space is a standard RGB (red, green, and blue) color space that is designed to match typical home and office viewing conditions. The AdobeRGB color space is designed to encompass most of the colors achievable with CMYK (cyan, magenta, yellow, and black) color printers, but by using RGB primary colors on a device such as a display device.

BRIEF DESCRIPTION OF THE DRAWINGS

Some embodiments are described with respect to the following figures.

DETAILED DESCRIPTION

Figure 1:
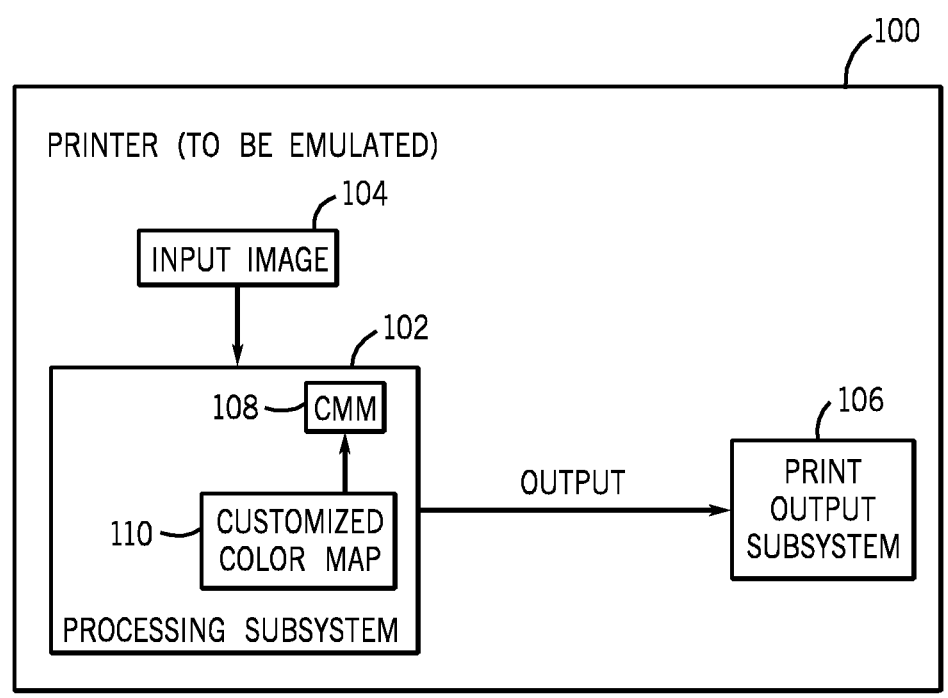
FIG. 1 is a block diagram of an example printer.

FIG. 1 illustrates an example printer 100 that has a processing subsystem 102 for receiving an input image 104 that is to be processed for printing by a print output subsystem 106. Although reference is made to printers in the ensuing discussion, it is noted that techniques or mechanisms according to some implementations can be applied to other types of output electronic devices, such as output devices that process images for display, and so forth.

The processing subsystem 102 can include a color management module (CMM) 108 that can apply color translation or conversion to the input image 104 that is to be printed by the printer 100. In some examples, a customized color map 110 can be provided in the processing subsystem 102. The customized color map 110 can be provided by a vendor or manufacturer (more generally "supplier") of the printer 100. The customized color map 110 may not be provided for colorimetric accuracy, but rather, can be provided to enhance printer gamut usage or to achieve some other goal of the supplier of the printer 100. The color gamut of the printer 100 refers to all available colors in the color space of the printer.

The customized color map 110 can be used by the CMM 108 to convert between a first device-dependent color space (e.g. sRGB color space or AdobeRGB color space) and a second device-dependent color space (e.g. printer native RGB color space, also referred to as dRGB color space). The RGB color space refers to the red, green, blue color space. In other examples, other color spaces can be employed, such as the CMYK (cyan, magenta, yellow, and black) color space, or other color space.

After the CMM 108 converts the input image 104 from a first device-dependent color space to a second device-dependent color space using the customized color map 110, the converted image is output to the print output subsystem 106 for printing.

A device-dependent color space refers to the color space defined by characteristics of a real or virtual output device (e.g. printer, display device, scanner, etc.). A device-dependent color space is contrasted with a device-independent color space, such as the CIELAB (L*a*b*) color space, where L represents lightness, while a and b represent color-opponent dimensions. In the ensuing discussion, the L*a*b color space is referred to as the Lab color space. In other examples, other device-independent color spaces can also be used.

In some examples, the customized color map 110 can be a proprietary color mapping that is not intended for public consumption—in other words, a user or a third party (other than the supplier of the printer 100) is unable to retrieve the customized color map 110. The customized color map 110 can be implemented as machine-readable instructions (e.g. firmware) incorporated into a hardware processing component of the processing subsystem 102. The hardware processing component can be an application-specific integrated circuit (ASIC) component—in other examples, the hardware processing component can be a different type of processing component, such as a digital signal processor, graphics processing unit, a general purpose processor, and so forth.

In some cases, a user of the printer 100 may wish to upgrade the printer 100 with a third-party raster image processor (RIP) to provide for enhanced processing. An RIP is a component used in a printing system to produce a raster image (also known as a bitmap) that is sent to the print output subsystem 106 for printing. An RIP can be implemented as either a software component, a firmware component, or a hardware component.

Once the printer 100 is upgraded with a new RIP, the upgraded printer 100 may no longer have access to the customized color map 110 that was originally provided with the printer 100. As a result, the RIP of the upgraded printer 100 may output printer colors that may not be consistent with the color appearance offered by the original processing subsystem 102 of the printer 100 that is based on the color map 110.

Also, in a different context, it may be desirable for other printers to produce consistent color appearance as the printer 100 (e.g. a legacy printer). The other printers may not be provisioned with the customized color map 110, and thus, may not be able to produce outputs having consistent color appearance as the printer 100.

In accordance with some implementations, techniques or mechanisms are provided to emulate the color mapping provided by the customized color map 110. In some examples, as noted above, the color mapping can be a mapping between sRGB and dRGB. In other implementations, different mappings between different device-dependent color spaces can be provided by a color map that is to be emulated.

In this manner, a path for color consistency (with the customized color map 110 offered by legacy printers, for example) is provided. To allow for emulation of the color mapping provided by the color map 110, an emulation abstract profile 200 as shown in FIG. 2 can be provided.

Figure 2:
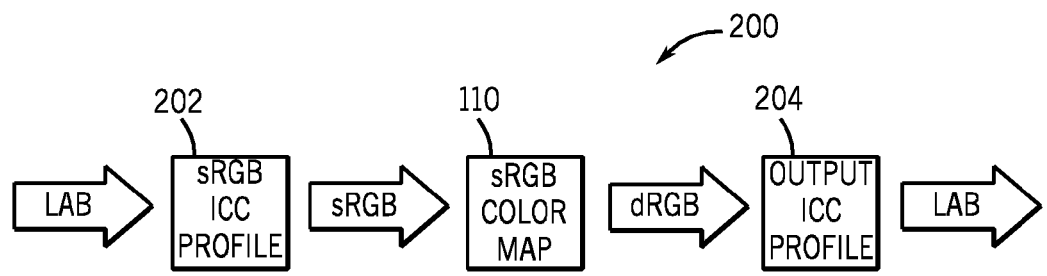
FIG. 2 illustrates concatenation of an input profile, a color map, and an output profile, to form an abstract profile in accordance with some implementations.

Although FIG. 2 refers to an example of using sRGB, other examples can involve use of other device-dependent color spaces.

The color map 110 (which in the example of FIG. 2 is an sRGB color map for mapping between sRGB and dRGB) is embedded in the emulation abstract profile 200. The color map 110 is linked (concatenated) between an input ICC (International Color Consortium®) profile 202 and an output ICC profile 204. An ICC profile defines a mapping between a device-dependent color space (e.g. sRGB color space, AdobeRGB color space, or other color space) and a device-independent color space (e.g. Lab color space). According to ICC, the device-independent color space can also be referred to as a profile connection space (PCS).

An ICC profile is a profile that is consistent with provisions of an ICC Specification, as established by the International Color Consortium®. More generally, other types of profiles can be used, where a profile defines a mapping between device-dependent and device-independent color spaces.

The PCS is a standard color space that provides an unambiguous connection between input and output profiles. An input ICC profile is associated with an input image whose color is to be transformed. An output ICC profile is associated with a device for outputting data, where the output device can be a printer or a display device, as examples. In the example of FIG. 2, the output ICC profile 204 is associated the printer 100 that is being emulated.

With the emulation abstract profile 200 shown in FIG. 2, an input Lab color space is converted by the input ICC profile 202 to an sRGB color space. The color map 110 of the emulation abstract profile 200 converts between the sRGB color space and a dRGB color space (the native color space of the printer 100 that is being emulated). The output ICC profile 204 converts between the dRGB color space and the Lab color space. Effectively, the emulation abstract profile 200 performs a round-trip color transform, in which Lab color is transformed to Lab color.

By embedding the color map 110 in the emulation abstract profile 200, the color map 110 is essentially placed in a "black box," and thus is not exposed to third parties. The supplier of the color map 110 who wishes to keep the color map 110 proprietary can thus enable emulation of the color map 110 without exposing the color map 110.

Figure 3:
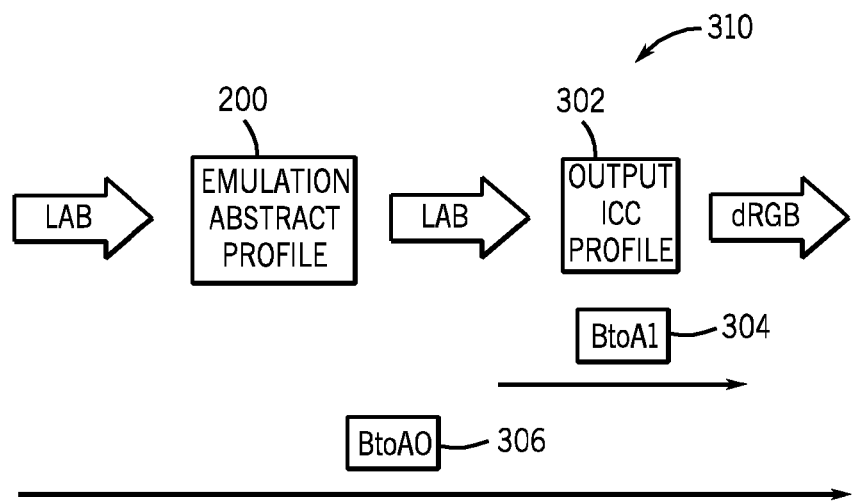
FIG. 3 illustrates concatenation of the abstract profile of FIG. 2 with an output profile of an emulating printer, according to some implementations.

As shown in FIG. 3, the emulation abstract profile 200 is further linked (concatenated) with an output ICC profile 302 of an emulating printer. In examples discussed above, the emulating printer can be a printer upgraded from the printer 100 (such as by using an external RIP). Alternatively, an emulating printer can be a printer different from the printer 100, where the emulating printer is to produce a color appearance that is consistent with the color appearance output by the printer 100, but where the emulating printer is not provisioned with the color map 110.

Note that while the output ICC profile 302 is associated with the emulating printer, the output ICC profile 204 in the emulation abstract profile 200 of FIG. 2 is associated with the printer 100 being emulated. By linking the emulation abstract profile 200 with the output ICC profile 302, a combined ICC profile 310 is provided that converts between the Lab color space and the dRGB color space—the emulation abstract profile 200 converts between Lab and Lab, while the output ICC profile 302 converts between Lab and dRGB.

The combined ICC profile 310 appears as a normal ICC profile that can be used for mapping between a device-dependent color space and a device-independent color space. The combined ICC profile 310 can be provided to an output device (e.g. emulating printer or other output device) to provide a color transform that employs the color map 110 of the printer 100 that is being emulated.

Further implementation details are also shown in FIG. 3. A BtoA1 table 304 represents a relative colorimetric intent, whereas a BtoA0 table 306 represents a perceptual intent. The arrows shown in FIG. 3 depict the direction in which the respective tables 304 and 306 are to be applied.

Color transformations can be represented by two profiles (an input profile and an output profile) or by a devicelink profile. When two profiles are being used, transforming profiled color information to different output devices is achieved by referencing the profile data into a standard color space, known as the profile connection space (PCS).

When the gamut of source color space exceeds that of the destination, saturated colors can become clipped (inaccurately represented). A color management module can deal with this issue in several ways. The ICC Specification provides four different rendering intents: absolute colorimetric, relative colorimetric, perceptual, and saturation. Appropriate tables, one for each intent and one for each direction, are stored in the profile for all but the absolute colorimetric intent. In the table name "A" is used to designate the device color space and "B" is used to designate the PCS.

The goal of the relative colorimetric intent is to be truthful to the specified color, with only a correction for the media white. The gamut mapping of the perceptual intent is vendor-specific and involves compromises. For example, the perceptual intent can specify that printer gamut usage is to be maximized, while sacrificing colorimetric accuracy.

Figures 4, 5:
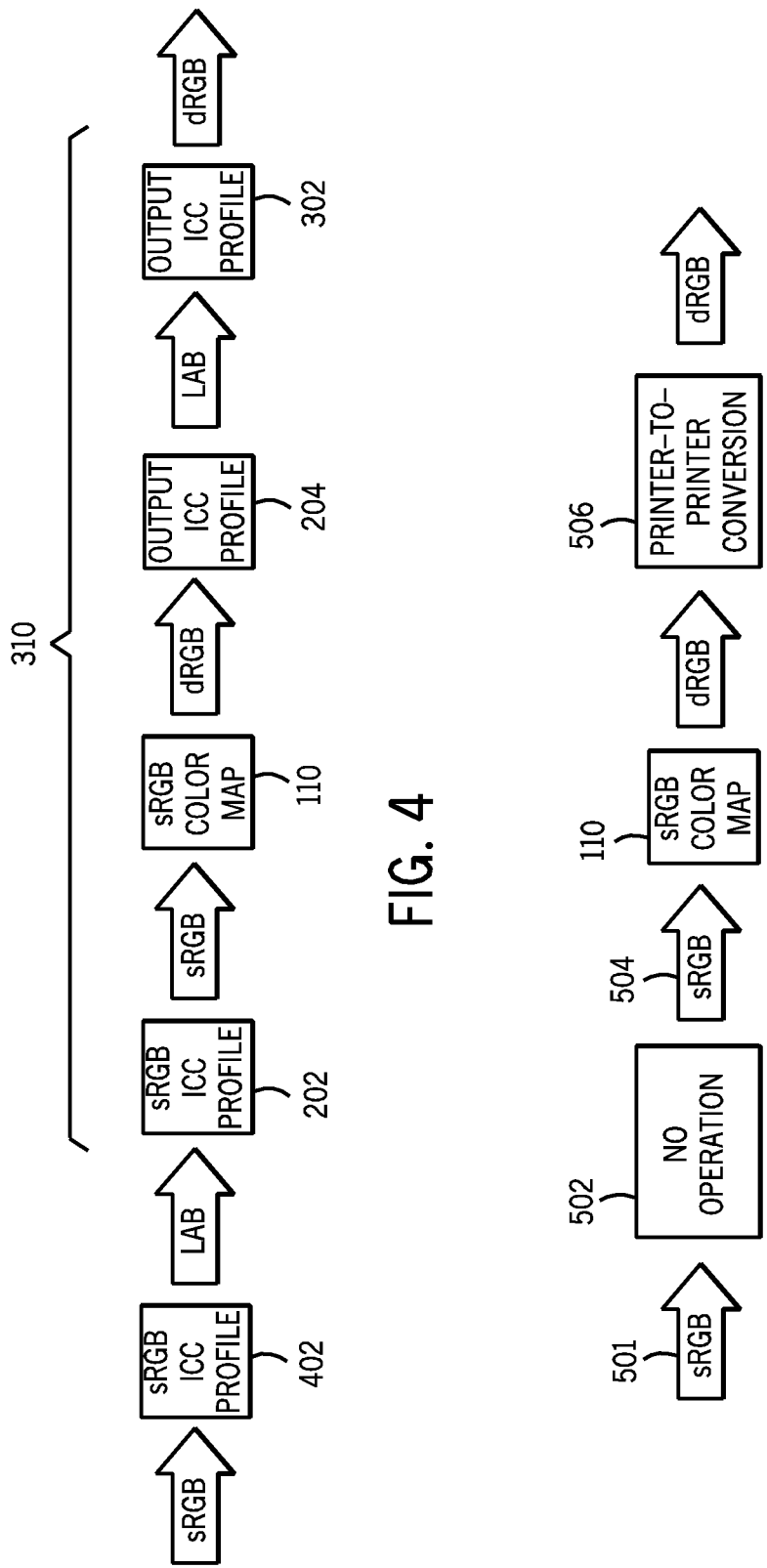
FIG. 4 illustrates a workflow that employs the combined profile of FIG. 3, according to some implementations.
FIG. 5 illustrates a different view of the workflow depicted in FIG. 4.

FIG. 4 illustrates an example color transform workflow in which the combined ICC profile 310 of FIG. 3 is used in an output device (e.g. an emulating printer or an output device having a display device). In FIG. 4, the combined ICC profile 310 (to be used as an output ICC profile) is linked to an input ICC profile 402, which can be the same as the input ICC profile 202 shown in FIG. 2. The input ICC profile 402 can be embedded or otherwise associated with the input image that is to be output by the output device.

The input ICC profile 402 performs a color transform of the input image between the sRGB color space and the Lab color space. After the transform by the input ICC profile 402, the combined ICC profile 310 is used to perform a transform between the Lab color space and the dRGB color space.

In alternative implementations, instead of using the input ICC profile 402 that maps between the sRGB color space and the Lab color space, a different input ICC profile can be used that maps between a CMYK color space (or other color space) and the Lab color space. In this way, RGB appearance consistent with the color appearance of the color map 110 can be obtained for an input CMYK image. More generally, using implementations described herein, emulation of the color appearance provided by the color map 110 can be accomplished no matter what color space the input image is in.

FIG. 5 shows a simplified representation of the color transform workflow of FIG. 4. Some examples of the sRGB ICC profiles 402 and 202 (of FIG. 4) can be implemented as a matrix shaper, such that the input ICC profiles round trip exactly. As a result, the combination of the conversions performed by the input ICC profiles 402 and 202 results in a no operation, indicated as 502 in FIG. 5. In other words, the data in the sRGB color space (504) after the transforms performed by input ICC profiles 402 and 202 is the same as the data received at the input 501 of the color transform workflow.

Additionally, the last two components of the color transform workflow shown in FIG. 4 can be represented as a printer-to-printer conversion 506 in FIG. 5. This printer-toprinter conversion converts between dRGB color space of the printer being emulated and the dRGB color space of the emulating printer.

Figure 6:
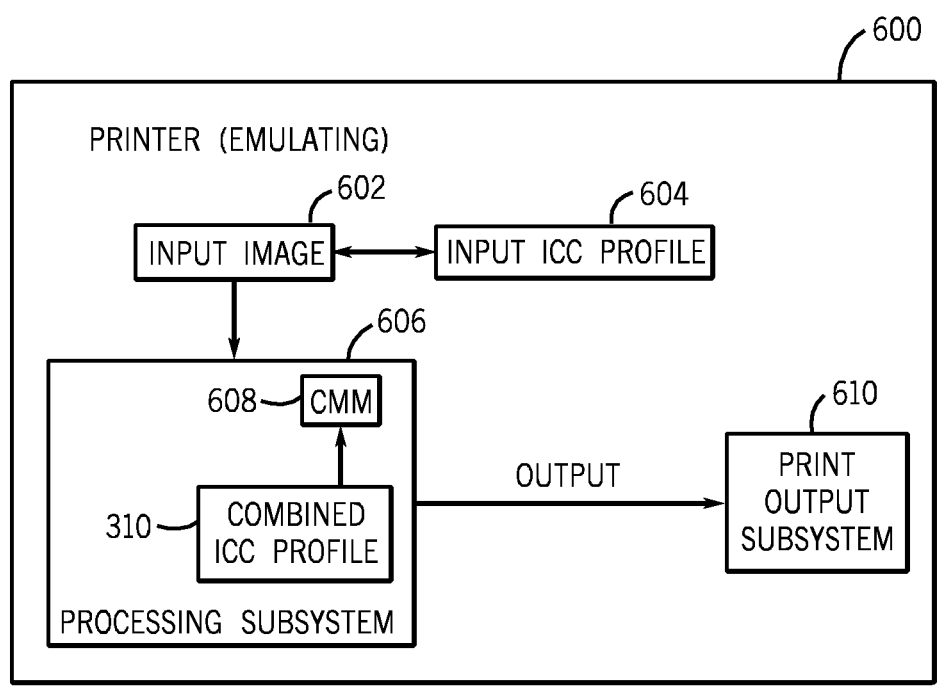
FIG. 6 is a block diagram of a printer that is able to use the combined profile of FIG. 3, according to some implementations.

An example emulating printer 600 is shown in FIG. 6. The emulating printer 600 receives an input image 602 that is associated with an input ICC profile 604. A processing subsystem 606 in the emulating printer 600 includes a CMM 608. The processing subsystem 606 is provided with the combined ICC profile 310 (FIG. 3)—for example, the combined ICC profile 310 can be stored in a storage medium associated with the processing subsystem 606. The CMM 608 links the input ICC profile 604 with the combined ICC profile 310 (as shown in FIG. 4) to perform color transform on the input image 602 to produce an output image in the dRGB color space of the emulating printer 600. This output image can be printed by a print output subsystem 610 of the emulating printer 600.

Figure 7:
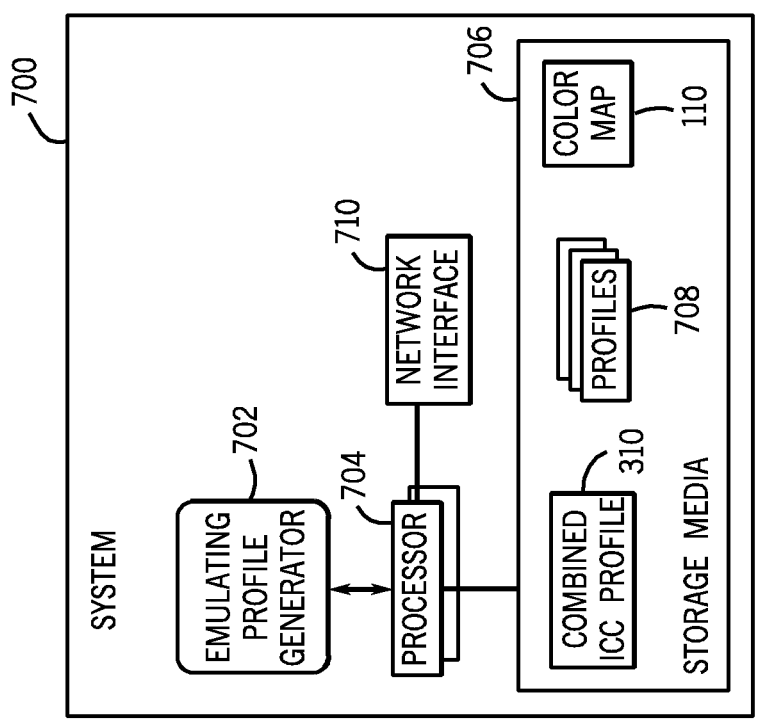
FIG. 7 is a block diagram of an example system configured to build a combined model according to some implementations.

FIG. 7 illustrates a system 700 that includes an emulating profile generator 702 that is executable on one or multiple processors 704. The processor(s) 704 is (are) coupled to storage media 706, which can store the color map 110 as well as the various profiles 708, including profiles 202, 204, and 302 shown in FIGS. 2 and 3. Based on the color map 110 and the profiles 708, the emulating profile generator 702 can produce the combined profile 310 shown in FIG. 3. This combined ICC profile 310 can be communicated by the system 700 through a network interface 710 to a remote system, such as the emulating printer 600 of FIG. 6, or other emulating output device.

Figure 8:
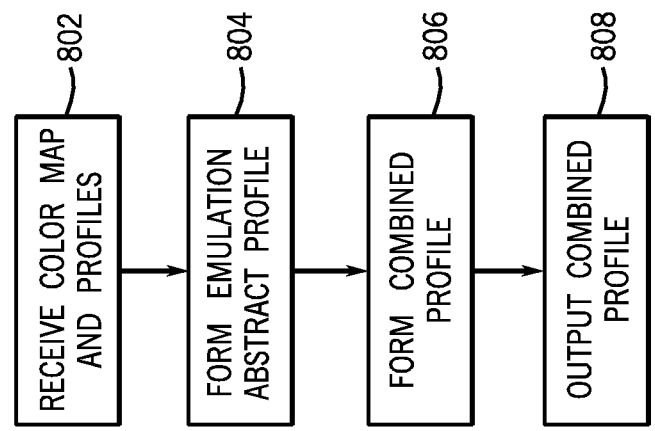
FIG. 8 is a flow diagram of a process performed by the system of FIG. 7, according to some implementations.

FIG. 8 is a flow diagram of a process performed by the emulating profile generator 702, in accordance with some implementations. The emulating profile generator 702 receives (at 802) the color map 110 to be emulated, the input ICC profile 202, and the output ICC profile 204 (associated with the printer 110 to be emulated). Using the color map 110, input ICC profile 202, and output ICC profile 204, the emulating profile generator 702 forms (at 804) the emulation abstract profile 200. The emulating profile generator 702 then forms (at 806) the combined ICC profile 310 that concatenates the emulation abstract profile 200 with the output ICC profile 302 of the emulating printer, as shown in FIG. 3.

The combined ICC profile 310 is then output (at 808) for use by an output device.

Using techniques or mechanisms according to some implementations, a relatively simple way of emulating a customized color map is provided. The emulation is provided by using an ICC profile embedded with the color map, so that special machine-readable instructions or plug-ins do not have to be employed. Also, the ICC profile that emulates the customized color map is recognized by any CMM available in RIPs. Also, by using the ICC profile that emulates the customized color map, soft-proofing of an image that is consistent in color appearance with the customized color map can be performed on a display device.

Machine-readable instructions of modules described above (such as emulating profile generator 702 of FIG. 7 and a CMM) are executed on a processor (such as 704 in FIG. 7). A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
providing a first profile that combines a color map between different device-dependent color spaces, with a first output profile that characterizes a mapping between a color space of a first output device being emulated and a device-independent color space; and
forming a second profile that combines the first profile with a second output profile that characterizes a mapping between a color space of a second output device and the device-independent color space, where the second profile is useable at the second output device to emulate the color map.

2. The method of claim 1, wherein providing the first profile further comprises providing the first profile that combines the color map, the first output profile, and an input profile associated with an input image.

3. The method of claim 2, wherein the color map maps between a device-dependent color space of the input image and the device-dependent color space of the first output device.

4. The method of claim 3, wherein providing the first profile comprises providing the first profile that performs a color transform between an input device-independent color space and an output device-independent color space.

5. The method of claim 4, wherein providing the first profile comprises providing the first profile that performs the color transform between an input Lab color space and an output Lab color space.

6. The method of claim 1, wherein forming the second profile comprises forming an ICC (International Color Consortium®) profile.

7. The method of claim 1, wherein the color map maps between a first RGB (red, green, blue) color space and a second RGB color space.

8. The method of claim 7, wherein the first RGB color space is an sRGB or an AdobeRGB color space.

9. An electronic device comprising:
a processing subsystem to:
receive an image to be processed;
perform a color transform on the image using a combined profile, wherein the combined profile is based on concatenation of a color map to be emulated, a first output profile of a first output device, and a second output profile of the electronic device that is to emulate the first output device, where the color map is to map between device-dependent color spaces, the first output profile characterizes a mapping between a color space of the first output device and a device-independent color space, and the second output profile characterizes a mapping between a color space of the electronic device and the device-independent color space; and output the color-transformed image.

10. The electronic device of claim 9, wherein the color-transformed image is output for printing.

11. The electronic device of claim 9, wherein the color-transformed image is output for display.

12. The electronic device of claim 9, wherein the color map is to map between a first RGB (red, green, blue) color space and a device-dependent RGB color space, where the first RGB color space is selected from among an sRGB (standard RGB) color space and an AdobeRGB color space.

13. The electronic device of claim 9, wherein the combined profile is an ICC (International Color Consortium®) profile.

14. The electronic device of claim 9, wherein the combined profile is based on concatenation of an input profile associated with an image to be output, the color map, the first output profile, and the second output profile, wherein the color map in the combined profile is linked between the input profile and the first output profile.

15. The electronic device of claim 9, wherein the processing subsystem is to perform the color transform by concatenating an input profile associated with the image with the combined profile.

16. The electronic device of claim 15, wherein the input profile characterizes a mapping between a color space of the image and the device-independent color space.

17. An article comprising at least one non-transitory machine-readable storage medium storing instructions that upon execution cause a system to:

form an abstract profile that combines a color map between different device-dependent color spaces, with a first output profile that characterizes a mapping between a color space of a first output device being emulated and a device-independent color space;

form a second profile that combines the abstract profile with a second output profile that characterizes a mapping between a color space of a second output device and the device-independent color space; and output the second profile to the second output device to allow the second output device to emulate the color map.

18. The article of claim 17, wherein the color map is embedded in the second profile such that the color map is not exposed.

19. The article of claim 17, wherein the second profile is an ICC (International Color Consortium®) profile.

20. The article of claim 17, wherein forming the abstract profile further comprises forming the abstract profile that combines the color map, the first output profile, and an input profile associated with an input image.

* * * * *